(12) United States Patent
Lin

(10) Patent No.: US 7,819,537 B2
(45) Date of Patent: Oct. 26, 2010

(54) FLASH UNIT

(75) Inventor: Jun-Han Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 272 days.

(21) Appl. No.: 12/203,084

(22) Filed: Sep. 2, 2008

(65) Prior Publication Data

US 2010/0020526 A1    Jan. 28, 2010

(30) Foreign Application Priority Data

Jul. 28, 2008    (CN) .................. 2008 1 0303129

(51) Int. Cl.
   *G03B 15/05*    (2006.01)

(52) U.S. Cl. .................. 362/17; 362/217.07

(58) Field of Classification Search .................. 362/7, 362/9, 16, 17, 223, 217.07

See application file for complete search history.

(56) References Cited

U.S. PATENT DOCUMENTS

| 4,223,372 A | * | 9/1980 | Takematsu | .................. 362/8 |
| 4,238,150 A | | 12/1980 | Quinn | |
| 4,356,533 A | * | 10/1982 | Takematsu | .................. 362/17 |
| 4,499,406 A | | 2/1985 | Saburo | |

FOREIGN PATENT DOCUMENTS

JP    3136024 A    6/1991

* cited by examiner

*Primary Examiner*—David V Bruce
(74) *Attorney, Agent, or Firm*—Clifford O. Chi

(57) ABSTRACT

A flash unit for an image capturing device includes a main body and a flash tube. The main body has a light emitting surface, a light reflecting surface, and two opposite end surfaces. The light reflecting surface is formed with a light-reflective film. The main body is made of transparent material and defines a through hole running through the two end surfaces. The flash tube is received in the through hole.

9 Claims, 3 Drawing Sheets

FLASH UNIT

TECHNICAL FIELD

The present invention relates to a flash unit and, particularly, to a flash unit for an image capturing device.

DESCRIPTION OF RELATED ART

Image capturing devices, such as film cameras, digital cameras, and mobile phones equipped with a camera module, typically employ a flash unit to illuminate a subject in low lighting.

A typical flash unit includes a flash tube, a reflector, a rubber base, and a shield. The flash tube is located within the reflector. The rubber base is configured for holding the flash tube and the reflector together. The shield covers an opening of the reflector to protect the flash tube. The flash tube includes a cylindrical tube and two electrical terminals, protruding outwardly from opposite ends of the cylindrical tube.

The typical flash unit has many components, bulky, and inconvenient and costlier to assemble.

Therefore, it is desirable to provide a flash unit, which can overcome the above-mentioned problems.

BRIEF DESCRIPTION OF THE DRAWING

Many aspects of the present assembly of the flash unit can be better understood with references to the following drawings. The components in the drawings are not necessarily drawn to scale, the emphasis instead being placed upon clearly illustrating the principles of the present assembly of the flash unit.

DETAILED DESCRIPTION OF THE EMBODIMENTS

Figure 1:
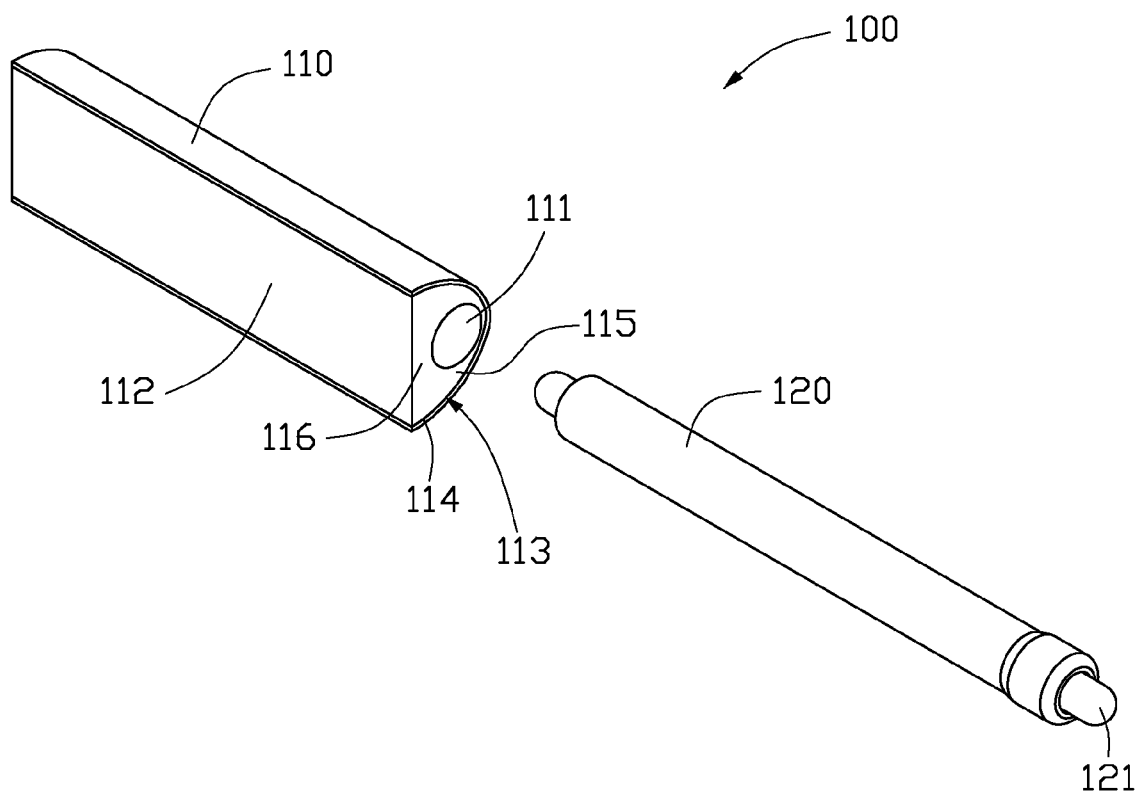
FIG. 1 is an exploded, isometric view of an embodiment of a flash unit.
Figure 2:
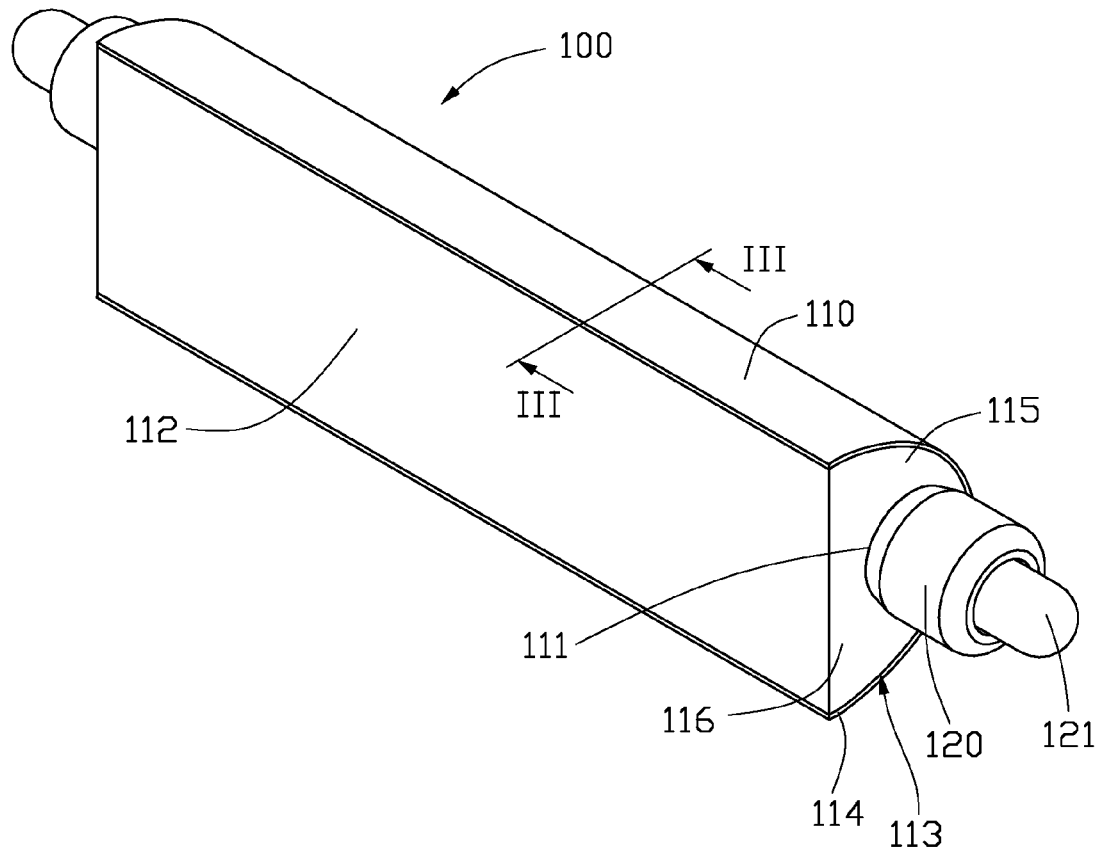
FIG. 2 is an assembled, isometric view of the flash unit of FIG. 1.
Figure 3:
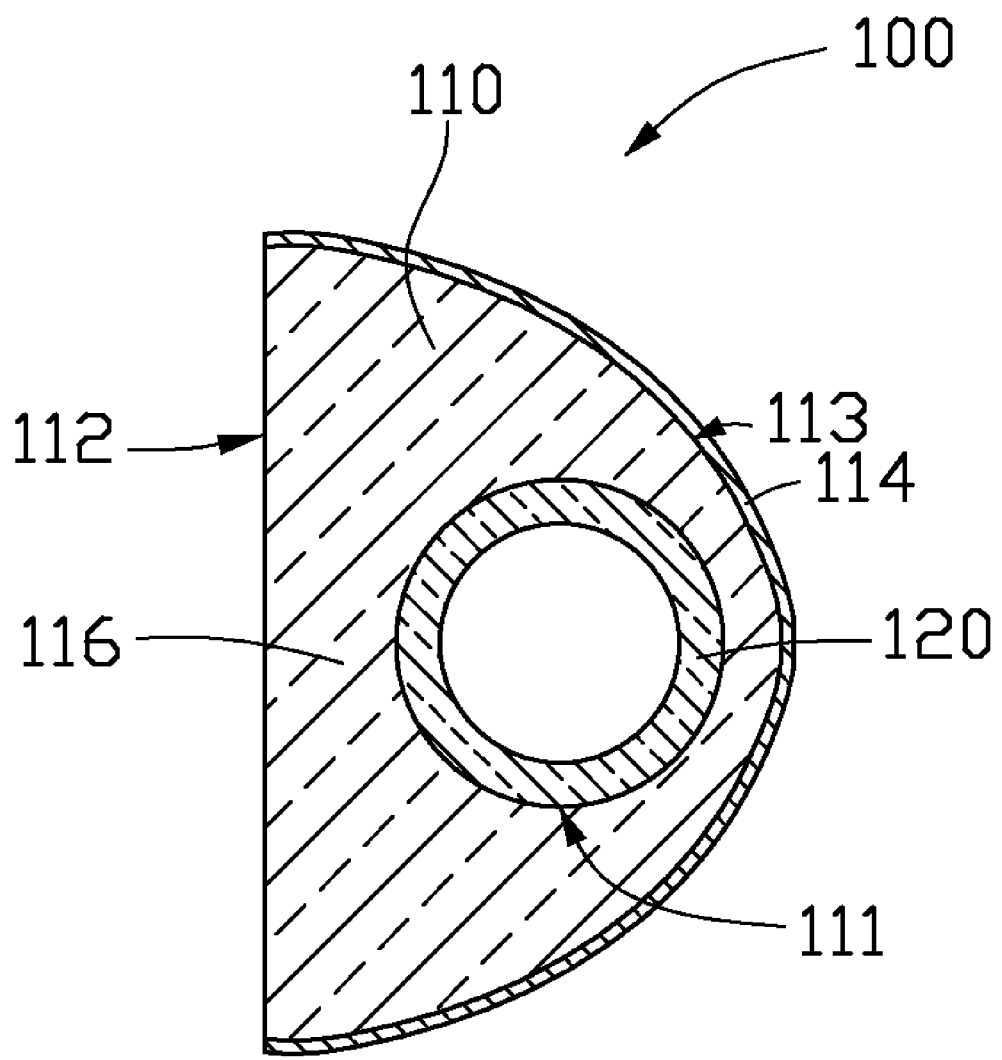
FIG. 3 is a cross-sectional view of the flash unit of FIG. 2, taken along line III-III.

Referring to FIGS. 1 through 3, a flash unit 100 includes a main body 110 and a flash tube 120.

The main body 110 may be made of a transparent material, such as transparent glass and transparent plastic. In one embodiment, the shape of the main body 110 may be semi-cylindrical shaped or semi-elliptical shaped. The main body 110 is enclosed by a light emitting surface 112, a light reflecting surface 113, and two opposite end surfaces 115. In one embodiment, the light emitting surface 112 is a flat surface and the light reflecting surface 113 is a curved surface. In an advantageous embodiment, the light emitting surface 112 may be a curved surface to efficiently control the concentration of the flash of light. A light-reflective film 114 is formed (e.g., coated) on the light reflecting surface 113. A light-reflective film 1114 is coated on the light reflecting surface 113, the light reflecting surface 113 is configured for collecting and reflecting the flash of light in a focused manner. In another embodiment, the curvature of the light reflecting surface 113 may be changed to control the direction/distribution of a flash of light. A through hole 111 extends through the two end surfaces 115 for receiving the flash tube 120. The central axis of the through hole 111 is substantially parallel to the light emitting surface 112. A transmitting portion 116 is defined between the through hole 1111 and the light emitting surface 112. The transmitting portion 116 may cause light emitting from the flash tube 120 to diverge.

In one embodiment, the flash tube 120 may be filled with a noble gas, such as xenon gas, and configured to create a bright flash when energized by a high voltage pulse. The flash tube 120 is received in the through hole 111. The flash tube 120 has two electrical terminals 121 protruding outwardly from opposite ends of the flash tube 120. In one embodiment, the two electrical terminals 121 are protruding out of the through hole 111 when the flash tube 120 is received in the main body 110. The two electrical terminals 121 are configured for connecting to an external power source (not shown) for high voltage pulse applications.

The main body 110 is integrally formed. Thus, it is more amenable to miniaturization and decreases manufacturing costs. In addition, the transmitting portion 116 of the main body 110 diverges light emitting from the flash tube 120 eliminating the need for a light diverging board.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A flash unit for an image capturing device, comprising:
   a main body comprising:
      a light emitting surface;
      a light reflecting surface;
      a light-reflective film formed on the light reflecting surface; and
      two opposite end surfaces, wherein a through hole extends through the two end surfaces;
   a flash tube comprising two electrical terminals at opposite ends of the flash tube,
      wherein the main body is made of a transparent material, the flash tube is received in the through hole.

2. The flash unit of claim 1, wherein the flash tube is filled with a noble gas and configured for creating a flash of light when a high voltage pulse is applied to the two electrical terminals.

3. The flash unit of claim 2, wherein the noble gas is xenon gas.

4. The flash unit of claim 1, wherein the shape of the main body is one selected from the group consisting of semi-cylindrical and semi-elliptical.

5. The flash unit of claim 1, wherein the light emitting surface is a flat surface and the light reflecting surface is a curved surface.

6. The flash unit of claim 1, wherein the light emitting surface is a curved surface.

7. The flash unit of claim 1, wherein the transparent material is one selected from the group consisting of transparent glass and transparent plastic.

8. The flash unit of claim 1, wherein a transmitting portion is defined between the through hole and the light emitting surface; the transmitting portion is configured for diverging a flash of light.

9. The flash unit of claim 1, wherein the flash tube has two electrical terminals protruding out of the through hole.

* * * * *